(12) United States Patent
Choi (10) Patent No.: US 8,676,110 B2
(45) Date of Patent: Mar. 18, 2014

(54) HINGE APPARATUS FOR COVER OF IMAGE FORMING APPARATUS

(71) Applicant: Samsung Electronics Co., Ltd., Suwon-si (KR)

(72) Inventor: Dong-Ha Choi, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 14/030,547

(22) Filed: Sep. 18, 2013

(65) Prior Publication Data

US 2014/0016978 A1 Jan. 16, 2014

Related U.S. Application Data

(63) Continuation of application No. 13/652,856, filed on Oct. 16, 2012, now Pat. No. 8,565,662, and a continuation of application No. 12/458,423, filed on Jul. 10, 2009, now Pat. No. 8,315,549, and a continuation of application No. 12/213,867, filed on Jun. 25, 2008, now Pat. No. 7,665,183, and a continuation of application No. 10/757,999, filed on Jan. 16, 2004, now Pat. No. 7,406,747.

(30) Foreign Application Priority Data

Apr. 30, 2003 (KR) .................. 10-2003-0027806

(51) Int. Cl.
*G03G 15/00* (2006.01)

(52) U.S. Cl.
USPC ............. 399/377; 399/379; 399/380; 16/277; 16/303; 16/325; 365/25; 358/497; 358/498

(58) Field of Classification Search
USPC ............ 399/377, 379, 380; 16/277, 303, 325; 355/25; 358/497, 498
See application file for complete search history.

(56) References Cited

U.S. PATENT DOCUMENTS

| | | | |
|---|---|---|---|
| 4,069,547 A | 1/1978 | Guionie et al. |
| 4,424,606 A | 1/1984 | Sorimachi |
| 4,660,251 A | 4/1987 | Watabe |
| 4,730,364 A | 3/1988 | Tat-Kee |
| 4,853,750 A | 8/1989 | Murata et al. |
| 4,896,189 A | 1/1990 | Akuzawa |

(Continued)

FOREIGN PATENT DOCUMENTS

| | | |
|---|---|---|
| DE | 3143786 | 6/1982 |
| FR | 2641382 | 7/1990 |

(Continued)

OTHER PUBLICATIONS

Office Action mailed Nov. 29, 2005 in U.S. Patent No. 7,406,747.

(Continued)

*Primary Examiner* — Ryan Walsh
(74) *Attorney, Agent, or Firm* — Staas & Halsey LLP (57) ABSTRACT

A hinge apparatus for a cover of an image forming apparatus has a hinge body with supporting brackets, movably inserted into a coupling hole positioned in a main body of the image forming apparatus, a hinge cam connected to the cover and pivotably connected to the supporting brackets, and a pressure device disposed at the hinge body to press the hinge cam. Accordingly, the hinge apparatus can be implemented with a simple and easy assembly operation, since it is not a complicated structural connection among the component parts of the hinge apparatus.

37 Claims, 7 Drawing Sheets

(56) References Cited

U.S. PATENT DOCUMENTS

| | | |
|---|---|---|
| 5,551,125 A | 9/1996 | Adams |
| 5,621,501 A | 4/1997 | Matsuo et al. |
| 5,812,285 A | 9/1998 | Lin et al. |
| 5,971,514 A | 10/1999 | Hayakawa |
| 6,012,714 A | 1/2000 | Worley et al. |
| 6,158,085 A | 12/2000 | Oshiro |
| 6,530,122 B1 | 3/2003 | Kondou et al. |
| 6,684,456 B2 | 2/2004 | Lee |
| 6,766,563 B2 | 7/2004 | Lee |
| 6,928,698 B2 | 8/2005 | Chen et al. |
| 6,972,878 B2 | 12/2005 | Shyu |
| 7,406,747 B2 | 8/2008 | Chol |
| 7,665,183 B2 | 2/2010 | Choi |
| 7,949,292 B2 | 5/2011 | Choi |
| 8,315,549 B2 | 11/2012 | Choi |
| 2004/0045129 A1 | 3/2004 | Tamehira et al. |
| 2004/0117948 A1 | 6/2004 | Ohara et al. |
| 2005/0031390 A1 | 2/2005 | Orozco-Abundis |

FOREIGN PATENT DOCUMENTS

| | | |
|---|---|---|
| GB | 2113291 | 8/1983 |
| JP | 11-305358 | 11/1999 |
| JP | 2002-014496 | 1/2002 |

OTHER PUBLICATIONS

Office Action mailed May 17, 2006 in U.S. Patent No. 7,406,747.
Advisory Action mailed Aug. 29, 2006 in U.S. Patent No. 7,406,747.
Office Action mailed Nov. 30, 2006 in U.S. Patent No. 7,406,747.
Interview Summary dated Mar. 20, 2007 in U.S. Patent No. 7,406,747.
Office Action mailed Jun. 6, 2007 in U.S. Patent No. 7,406,747.
Interview Summary dated Oct. 4, 2007 in U.S. Patent No. 7,406,747.
Office Action mailed Jan. 25, 2008 in U.S. Patent No. 7,406,747.
Notice of Allowance mailed Apr. 11, 2008 in U.S. Patent No. 7,406,747.
Office Action mailed Feb. 18, 2009 in U.S. Patent No. 7,665,183.
Office Action mailed Jun. 8, 2009 in U.S. Patent No. 7,665,183.
Notice of Allowance mailed Jan. 25, 2008 in U.S. Patent No. 7,665,183.
Office Action mailed Nov. 3, 2010 in U.S. Patent No. 7,949,292.
Notice of Allowance mailed Mar. 15, 2011 in U.S. Patent No. 7,949,292.
Office Action mailed May 4, 2012 in U.S. Appl. No. 12/458,423.
Notice of Allowance mailed Jul. 16, 2012 in U.S. Appl. No. 12/458,423.
Office Action issued Jan. 23, 2013 in U.S. Appl. No. 13/652,856.
Notice of Allowance issued Jun. 19, 2013 in U.S. Appl. 13/652,856.
U.S. Appl. No. 13/652,856, filed Oct. 16, 2012, Dong-Ha Choi, Samsung Electronics Co., Ltd.

HINGE APPARATUS FOR COVER OF IMAGE FORMING APPARATUS

CROSS-REFERENCE TO RELATED APPLICATIONS

This application is a continuation of U.S. patent application Ser. No. 13/652,856 filed on Oct. 16, 2012 in the U.S. Patent and Trademark Office. U.S. patent application Ser. No. 13/652,856 is a continuation of U.S. patent application Ser. No. 12/458,423 filed on Jul. 10, 2009 in the U.S. Patent and Trademark Office. U.S. patent application Ser. No. 12/458,423 issued as U.S. Pat. No. 8,315,549 on Nov. 20, 2012. U.S. patent application Ser. No. 12/458,423 filed on Jul. 10, 2009 is a continuation of U.S. patent application Ser. No. 12/213,867 filed on Jun. 25, 2008 in the U.S. Patent and Trademark Office. U.S. patent application Ser. No. 12/213,867 issued as U.S. Pat. No. 7,665,183 on Feb. 23, 2010. U.S. patent application Ser. No. 12/213,867 is a continuation of U.S. patent application Ser. No. 10/757,999 filed on Jan. 16, 2004 in the U.S. Patent and Trademark Office. U.S. patent application Ser. No. 10/757,999 issued as U.S. Pat. No. 7,406,747 on Aug. 5, 2008. This application claims the priority benefit of U.S. patent application Ser. No. 13/652,856, the priority benefit of U.S. patent application Ser. No. 12/458,423 (now U.S. Pat. No. 8,315,549), the priority benefit of U.S. patent application Ser. No. 12/213,867 (now U.S. Pat. No. 7,665,183), the priority benefit of U.S. patent application Ser. No. 10/757,999 (now U.S. Pat. No. 7,406,747), and the priority benefit of Korean Patent Application No. 10-2003-0027806, filed Apr. 30, 2003 in the Korean Intellectual Property Office, the disclosures of which are incorporated herein by reference.

BACKGROUND OF THE INVENTION

1. Field of the Invention

The present invention relates to a hinge apparatus, and more particularly to a hinge apparatus that supports a cover of an image forming apparatus, such as a photocopier, a scanner, or a multifunction machine, so that the cover thereof pivotably opens and closes.

2. Description of the Related Art

An image forming apparatus, which has document scanning function like a photocopier, a scanner, or a multifunction machine, scans a document, then stores a scanned image as data, or prints the image on a printing paper. Such an image forming apparatus includes a document glass disposed on a main body of the image forming apparatus to scan the document, a cover to secure the document laid on the document glass, and a hinge apparatus connecting the cover and the main body of the image forming apparatus.

Figure 1:
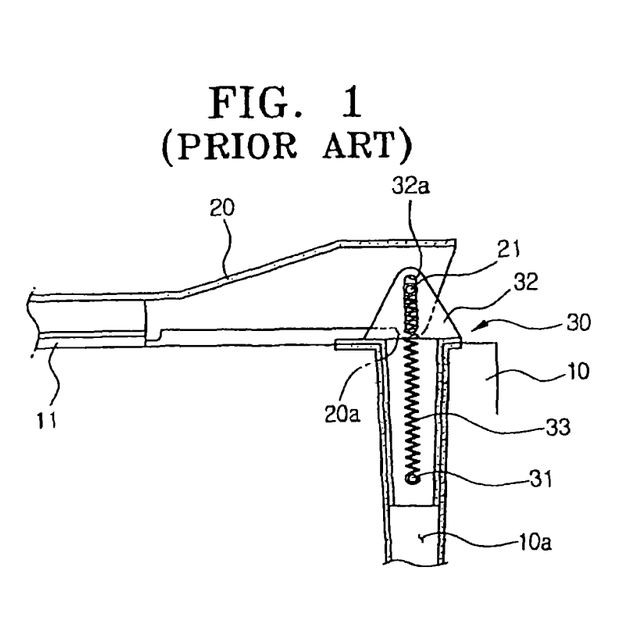
FIG. 1 shows a cross sectional view of a conventional hinge apparatus to open and close a cover of an image forming apparatus.

FIG. 1 shows a hinge apparatus 30 to open and close the cover of the conventional image forming apparatus 10, disclosed in Japanese Patent Publication No. 11305358. As shown in FIG. 1, the conventional hinge apparatus 30 includes a hinge body 32 integrally formed with a spring pin 31, and a spring 33 connected to the spring pin 31 at one end. A cover 20 is provided with a hinge pin 21 that is inserted into a long hole 32a positioned in the hinge body 32. The spring 33 is connected to the hinge pin 21, and therefore, the cover 20 and the hinge apparatus 30 form a set. A cam part 20a, which is disposed at the cover 20, is in tight contact with the hinge body 32 under a recovery force of the spring 33. Furthermore, the hinge body 32 is disposed to move upward and downward within a coupling hole 10a positioned in the main body of the image forming apparatus 10.

The conventional image forming apparatus with the above structure has a document glass 11, which is exposed and covered through pivoting of the cover 20 centering on the hinge pin 21. The cover 20 opens and closes slowly, since the cover 20 is moved with the cam part 20a of the cover 20 being in close contact with the hinge body 32. Moreover, when a thick document is laid upon the document glass 11, the hinge body 32 is lifted upward to a predetermined height, so that the cover 20 uniformly presses the document, such as a thick book, laid upon the document glass 11.

But in the above conventional hinge apparatus 30, there is a difficulty in assembling the cover 20 and the hinge apparatus 30, since the both ends of the spring 33 are directly connected with the cover 20 and the hinge body 32, that are respectively at an opposite side. In other words, the spring 33 has a high elastic modulus to secure a slow opening and closing of the cover is used, and accordingly it is not easy to connect the spring 33 with the spring pin 31 of the hinge apparatus 30 and with the hinge pin 21 of the cover 20.

Also, a friction between the cam part 20a of the cover 20 and the hinge body 32 generates a noise in opening and closing of the cover 20. Another problem is that the hinge body 32 can be released out of the coupling hole 10a of the main body of the image forming apparatus, when a thick document is being scanned.

SUMMARY OF THE INVENTION

The present invention has been made to solve the aforementioned problems. Accordingly, an aspect of the present invention is to provide a hinge apparatus for a cover of an image forming apparatus, which is assembled with ease and decreases a noise occurring in opening and closing the cover.

To achieve the above and/or other aspects of the present invention, a hinge apparatus for a cover of the image forming apparatus is provided. The hinge apparatus opens and closes the cover of the image forming apparatus, and pivotably connects a main body of the image forming apparatus with the cover, to expose and cover a document glass. The hinge apparatus has: a hinge body, movably inserted in a first direction into a coupling hole positioned in the main body of the image forming apparatus, and having supporting brackets; a hinge cam, of which one side is connected to the cover, and pivotably connected to the supporting brackets; and a pressure device disposed at the hinge body to press the hinge cam.

According to one aspect, a housing chamber is provided within the hinge body, and the pressure device has: a pusher disposed in the housing chamber, that protrudes out of the housing chamber; and a spring disposed within the housing chamber to press the pusher.

According to one aspect, the hinge cam has a body portion connected to the cover, and a cam part pivotably connected to the body in close contact with the pressure device.

According to one aspect, each of the supporting brackets and the cam part is provided with a shaft hole, and the hinge apparatus additionally has a hinge shaft inserted through the respective shaft holes, to pivotably connect the cam part with the supporting brackets.

According to one aspect, a center of the hinge shaft is located toward the document glass compared to a pressure central line of the pressure device.

According to one aspect, the pusher has a locking protrusion, the hinge body is provided with a guide slot, and the locking protrusion is inserted into the guide slot, and prevents the release of the pusher from the hinge body.

According to one aspect, the hinge body has, a first protrusion positioned at one side of the hinge body, to prevent the supporting brackets from entering the coupling hole.

According to one aspect, the main body has: a hooking portion positioned at the lower part of the main body of the image forming apparatus; and, the hinge body has a second protrusion positioned at a first side of the hinge body, that is caught by the hooking portion, which prevents the release of the hinge body from the coupling hole when the hinge body is moved in a direction opposite the first direction.

According to one aspect, at least one of the pusher and the hinge cam is made of a lubricating resin.

Additional aspects and/or advantages of the invention will be set forth in part in the description which follows and, in part, will be obvious from the description, or may be learned by practice of the invention.

BRIEF DESCRIPTION OF THE DRAWINGS

These and other features, aspects, and/or advantages of the present invention will become apparent and more readily appreciated from the following description of the embodiments, taken in conjunction with the accompanying drawings, in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
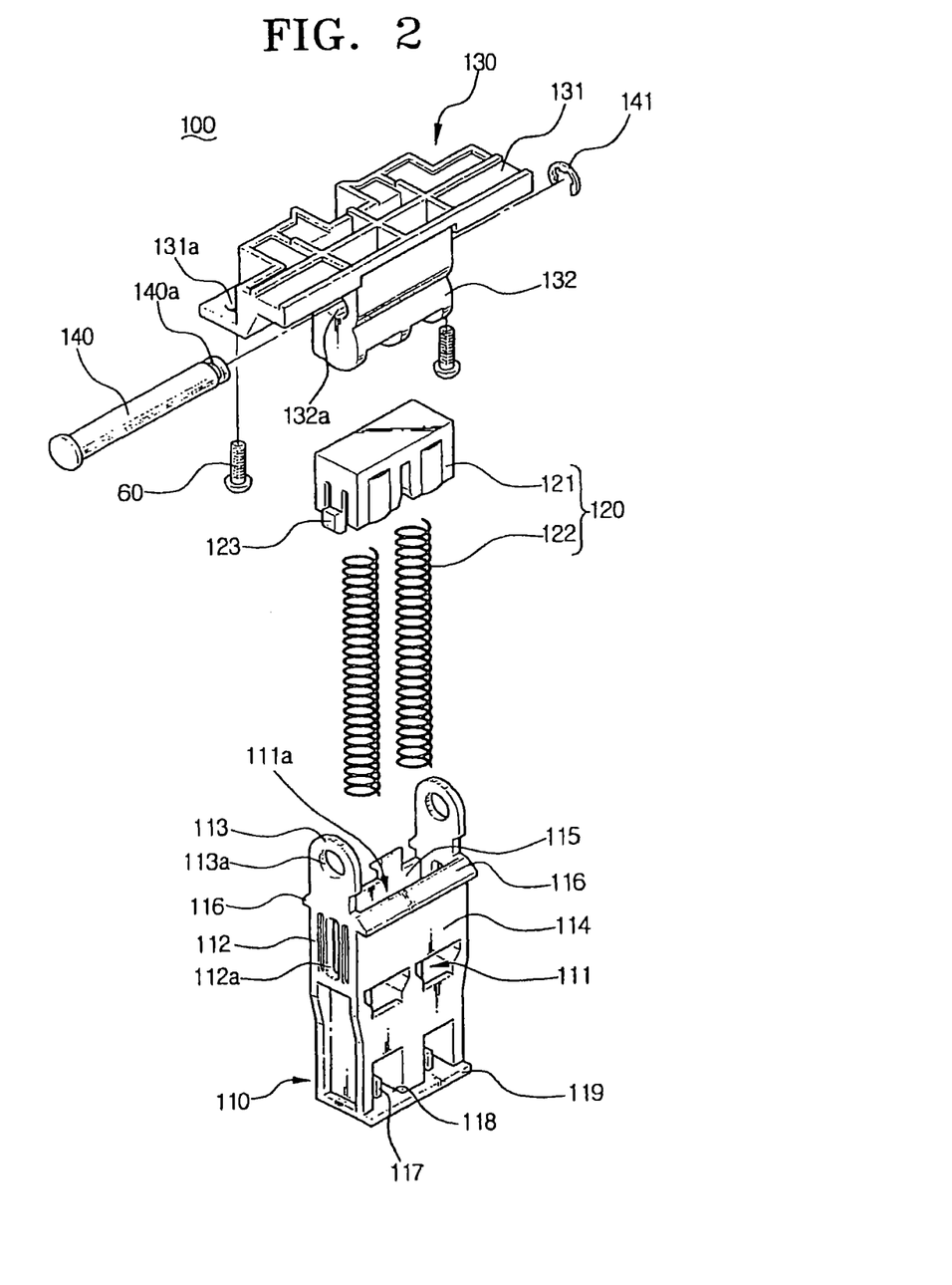
FIG. 2 shows an exploded perspective view of a hinge apparatus to open and close a cover according to an embodiment of the present invention.
Figure 3:
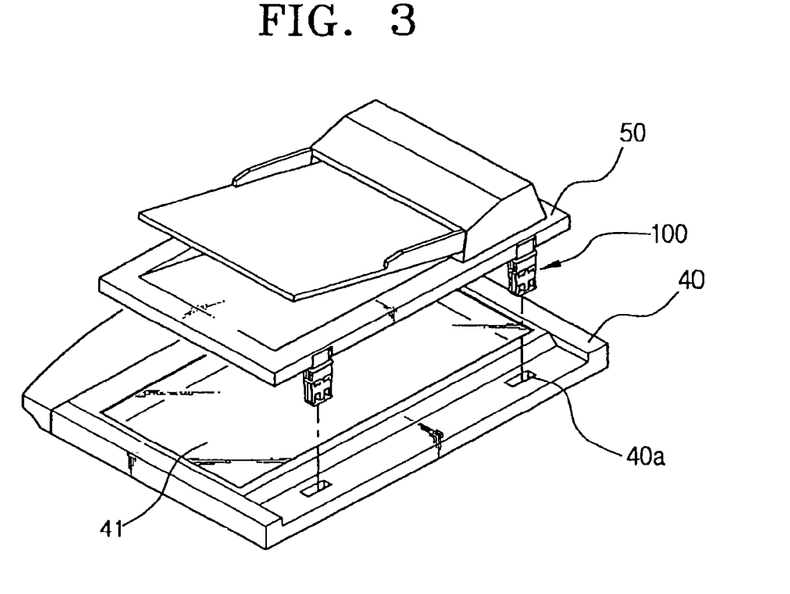
FIG. 3 shows a view of the hinge apparatus of FIG. 2 connected to the cover of the image forming apparatus after assembly.

Referring to FIGS. 2 and 3, a hinge apparatus 100 to open and close a cover 50 of an image forming apparatus 40, according to an embodiment of the present invention, includes a hinge body 110, a pressure device 120, and a hinge cam 130.

The shown embodiment of the hinge body 110 has a configuration of a hexahedron box, of which an interior is void and one side is opened, and is received in a coupling hole 40a positioned in a main body of the image forming apparatus 40, to be moved upward and downward. A housing chamber 111 is provided inside of the hinge body 110, and at one side of the housing chamber 111, an open portion 111a is positioned to communicate with an exterior. It is understood, however, that the hinge body 110 can have other configurations that the shown hexahedron box.

Furthermore, a pair of supporting brackets 113 extended from sidewalls of the hinge body 110, and are positioned at sides of the open portion 111a. Each of the supporting brackets 113 supports the hinge cam 130 and has a shaft hole 113a therein. At the sidewalls of the hinge body 110, guide slots 112a are positioned to guide an upward and downward movement of the pressure device 120.

Also, on each of a front wall 114 and a rear wall 115 of the hinge body 110, that are connected with the sidewalls, a first protrusion 116 is positioned to protrude outward, thereby restricting the inserting range of the supporting brackets 113 into the coupling hole 40a. The first protrusions 116 are located at lower parts of the supporting brackets 113. When the hinge body 110 is inserted into the coupling hole 40a, the first protrusions 116 are caught at the main body of the image forming apparatus 40, and therefore, the supporting brackets 113 protrude above a document glass 41 of the main body of the image forming apparatus 40.

Also, on a bottom wall 118 of the hinge body 110 opposite to the open portion 111a, a spring support 117 protrudes to support a first end of a spring 122, which will be described later.

Figure 4:
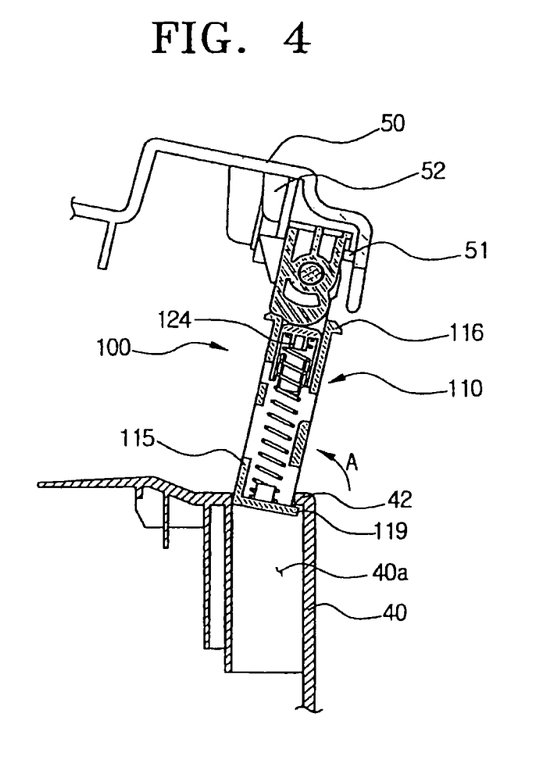
FIGS. 4 through 7 show cross sectional views, to describe an operation of the hinge apparatus of FIG. 2.

In addition, at a lower part of the front wall 114, a second protrusion 119 protrudes, and is coplanar with the bottom wall 118. When the hinge body 110 is moved out of the coupling hole 40a, since the second protrusion 119 is caught by a hooking portion 42 disposed at one side of the main body of the image forming apparatus 40, as shown in FIG. 4, the release of the hinge body 110 from the coupling hole 40a is prevented.

The pressure device 120 includes a pusher 121 and the spring 122, for a smooth pivoting of the hinge cam 130, since the pressure device 120 inhibits the pivoting of the hinge cam 130 pivotably supported by the supporting brackets 113. The pusher 121 is disposed to move downward and upward, to protrude outward through the open portion 111a of the hinge body 110. The pusher 121 has locking protrusions 123 on opposing sides, positioned so that the locking protrusion 123 is inserted into the guide slots 112a of the hinge body 110. Therefore, the pusher 121 moves upward and downward within the length of the guide slots 112a, so that the pusher 121 is not released from the hinge body 110. The spring 122, that presses the pusher 121 toward the open portion 111a, is disposed within the housing chamber 111. The first end of the spring 122 is supported by the spring support 117 of the hinge body 110, and a second end of the spring 122 is supported by a spring support 124 (see FIG. 4) positioned at a lower part of the pusher 121.

In assembling the pressure device 120, after the spring 122 is disposed in the housing chamber 111, the pusher 121 is connected to the hinge body 110. The pusher 121, which is elastically supported by the spring 121, has the locking protrusions 123, which contact upper sides of the guide slots 112a. Assembly is simplified if a length of the spring 122 is substantially the same as a height from a bottom of the pusher 121 to the bottom wall 118 when the locking protrusions 123 contact the upper sides of the guide slots 112a. In this case, as the pusher 121 is pushed into the housing chamber 111 to insert the locking protrusions 123 into the guide slots 112a, a strain of the spring 122 does not occur. Accordingly, the user does not need to induce a strain pressure on the spring 122, which according to one aspect, has a high elastic stiffness. While described in terms of a spring 122, it is understood that other mechanisms can be used to bias the pusher 121, such as combinations of springs, hydraulic or pneumatic mechanisms, elastic materials, of other such devices.

In addition, according to one aspect, the pusher 121 is made of a lubricating resin, since there is a friction inherent in the sliding movement of the hinge cam 130. So-called "engineering plastics" can be used as the lubricating resin, such as polyethylene, polybutylene terephthalate, and polyamide.

The hinge cam 130 includes a body portion 131 connected to the cover 50 of the image forming apparatus, and a cam part 132 to slide in close contact with the pusher 121, under a predetermined pressure. The body portion 131 has a screw hole 131a, and is combined with the cover 50 by inserting a fastening member, like a screw 60, into a boss portion 52 (see FIG. 4), through the screw hole 131a, with one side of the body portion 131 being supported by a locking projection 51 (see FIG. 4) in the cover 50.

The cam part 132 is integrally combined to the body portion 131, and has a shaft hole 132a. To put the hinge cam 131 in a condition ready to pivot on a hinge shaft 140, the cam part 132 is positioned in such a manner that the shaft hole 132a of the cam part 132 is aligned with the shaft holes 113a of the supporting brackets 113, and then the hinge shaft 140 is inserted into each shaft hole 113a, 132a.

A groove portion 140a is positioned at one end of the hinge shaft 140. When the hinge shaft 140 is inserted into and passed through the shaft hole 132a of the cam part 132 and the shaft holes 113a of the supporting brackets 113, a coupling ring 141 is fixed to the groove portion 140a. As a result, the hinge shaft 140 is prevented from releasing out of each shaft hole 113a, 132a.

Figure 5:
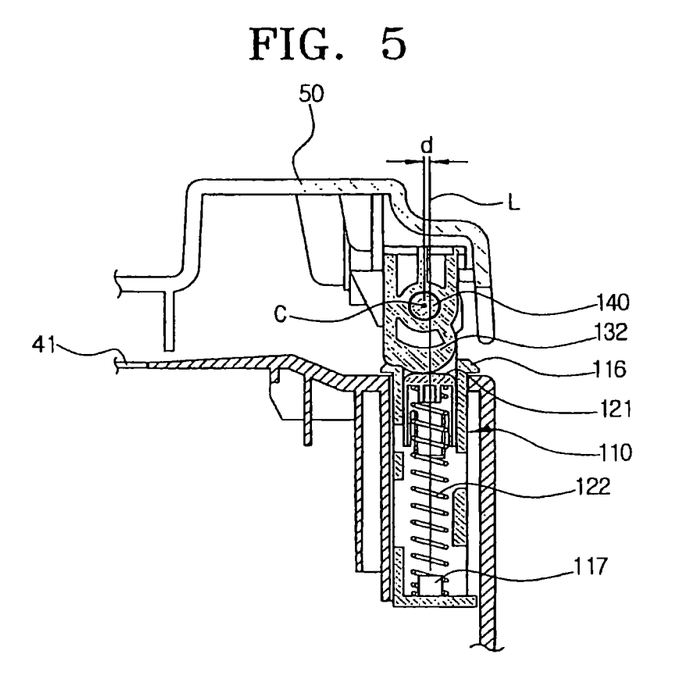

As shown in FIG. 5, according to one aspect, a center C of the hinge shaft 140 is located at a predetermined interval toward a direction of the document glass 41 from a pressure central line L of the hinge cam 130 and the pusher 121. As a result, the pivot of the hinge cam 130 is more efficiently inhibited. According to one aspect, this allows, the spring 122 employed to be inexpensive, and have a low elastic modulus. In addition, according to one aspect, since there is friction inherent in the sliding movement of the pusher 121, the hinge cam 130 is made with a lubricating resin, such as polyethylene, polybutylene terephthalate, and polyamide.

Meanwhile, although the above embodiment of the present invention employs the hinge shaft 140 as a way to combine the hinge cam 130 to the hinge body 110, the present invention is not limited to this embodiment. Therefore, the hinge cam 130 can be pivotably connected to the hinge body 110 through various ways. For example, according to one aspect, although not shown in the drawings, protrusions are positioned at sides of the cam part 132 in the hinge cam 130, and the protrusions are inserted into the shaft holes 113a of the supporting brackets 113.

Hereinafter, referring to the attached drawings, an operation of the hinge apparatus 100 according to an embodiment of the present invention is described in detail.

To insert the hinge apparatus 100 connected with the cover 50 into the coupling hole 40a in the main body of the image forming apparatus 40, as shown in FIG. 4, the hinge body 110 is first tilted so that the second protrusion 119 can be inserted into the coupling hole 40a in the main body of the image forming apparatus 40. Then, after moving the hinge body 110 to an upright position along a direction of arrow A, and inserting an end of the rear wall 115 of the hinge body 110 into the coupling hole 40a, the hinge body 110 is pushed into the coupling hole 40a. As the first protrusion 116 of the hinge body 110 contacts an upper side of the main body of the image forming apparatus 40, the cover 50 and the main body of the image forming apparatus 40 are coupled by the hinge apparatus 100. The cover 50 can secure a thin document such as a sheet of paper in tight contact with the document glass 41, as shown in FIG. 5.

Figure 6:
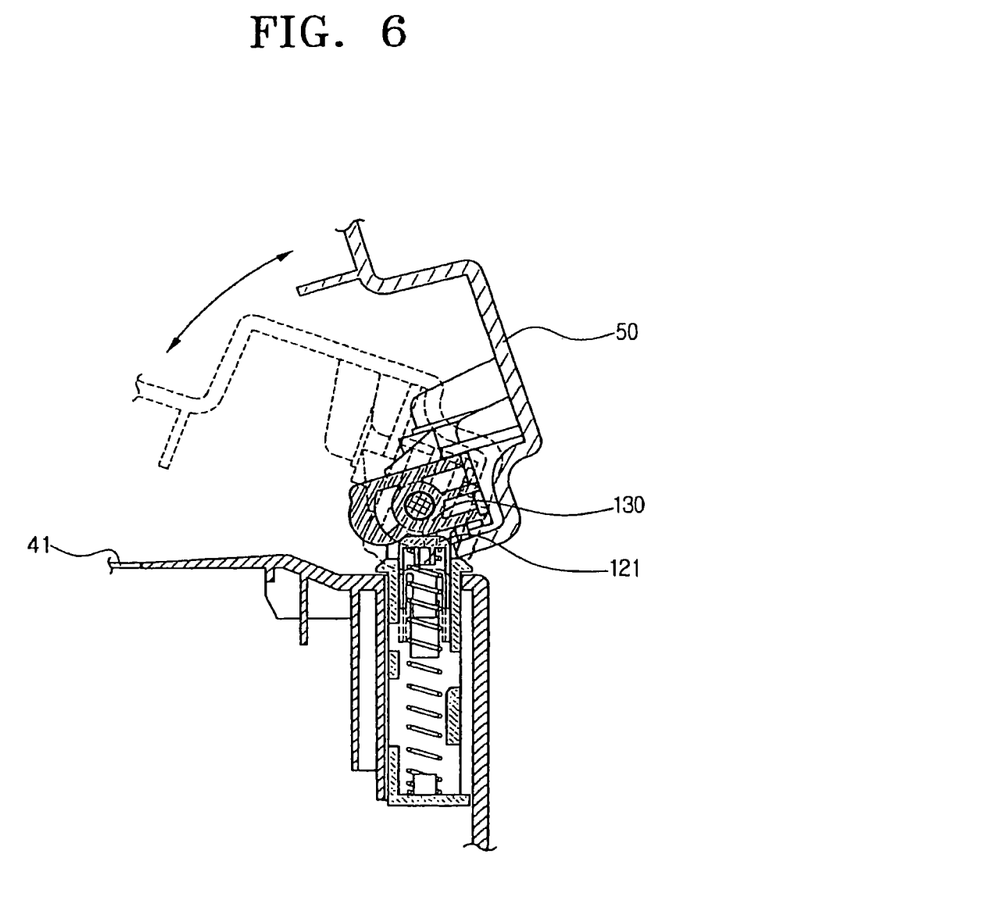

In addition, to open the cover 50 and expose the document glass 41, as shown in FIG. 6, the cover 50 is pivoted and pushed over completely in a clockwise direction, and then the hinge cam 130 and the pusher 121 contact under the least pressure, since the spring is in a least compressed state. Then, if a document is positioned on the document glass 41 and the cover 50 is pivoted in a counterclockwise direction, the pivoting of the hinge cam 130 is inhibited, as the pressure between the hinge cam 130 and the pusher 121 increases continuously. As a result, the cover 50 closes slowly.

Figure 7:
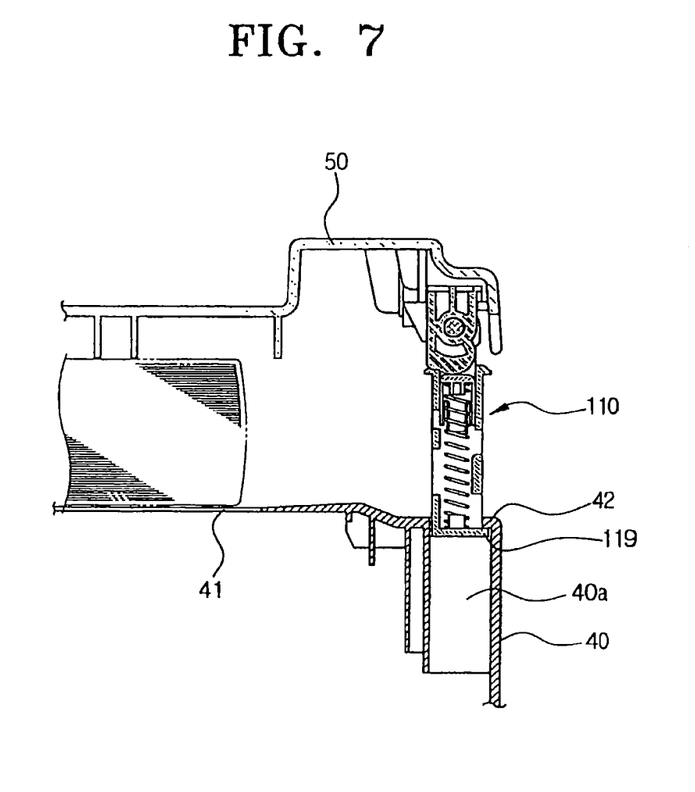

In the mean time, if a thick document, like a book, is positioned on the document glass 41, as shown in FIG. 7, the hinge body 110 is moved upward to an upper side of the coupling hole 40a, to expand a space between the cover 50 in the closed position and the document glass 41. In a process of moving the hinge body 110 to the upper side of the coupling hole 40a, the second protrusion 119 of the hinge body 110 is caught by the hooking portion 42 on the main body of the image forming apparatus 40. Consequently, the hinge body 110 is not released out of the coupling hole 40a.

According to the embodiment of the present invention described above, there is an advantage that the hinge apparatus 100 can be implemented with a simple and easy assembly operation, since it is not a complicated structural connection among the component parts that compose the hinge apparatus 100.

Also, the hinge apparatus 100 can efficiently improve the usability of the image forming apparatus, since the hinge apparatus 100 decreases noise occurring when opening and closing the cover 50, and prevents the cover 50 from unintentionally closing.

While described as being used in an image forming apparatus, it is understood that the hinge apparatus 100 would be useful in other devices beyond image forming apparatuses, such as presses that compress various size items, cooking apparatuses, etc.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. An image forming apparatus comprising:
a main body having a document platen on which a document can be placed;
a scanner cover to open and close an upper side of the document platen; and
a hinge apparatus pivotably supporting the scanner cover to the main body,
wherein the hinge apparatus comprises:
a first body, with a void therein, movable in an opening in the main body;
a pressure device movable within the void, and biased toward a first end of the first body;
a second body, coupled to the scanner cover, rotatably connected to the first body, and movably engaging the pressure device; and
a hinge shaft rotatably connecting the second body to the first body,
wherein a center of the hinge shaft is located at a predetermined distance toward a direction of the document platen from a central line, along which a center of the pressure device and the second body move, and
wherein the first body comprises a first protrusion, to limit an amount that the first body moves into the opening in the main body.
2. The image forming apparatus according to claim 1, wherein the second body is made of a lubricating resin.
3. The image forming apparatus according to claim 2, wherein the lubricating resin is selected from a group consisting of polyethylene, polybutylene terephthalate, and polyamide.

4. The image forming apparatus according to claim 1, wherein the pressure device comprises:
    a pusher; and
    a biasing element which biases the pusher toward the first end of the first body.

5. The image forming apparatus according to claim 4, wherein the pusher is made of a lubricating resin.

6. The image forming apparatus according to claim 5, wherein the lubricating resin is selected from a group consisting of polyethylene, polybutylene terephthalate, and polyamide.

7. The image forming apparatus according to claim 4, wherein an upper end of the biasing element is supported by a first support provided on the pusher.

8. The image forming apparatus according to claim 4, wherein a lower end of the biasing element is supported by a second support provided on the first body.

9. The image forming apparatus according to claim 1, wherein the main body is provided with a hooking portion for catching a second protrusion of the first body.

10. An image forming apparatus comprising:
    a main body having a document platen on which a document can be placed;
    a scanner cover to open and close an upper side of the document platen; and
    a hinge apparatus pivotably supporting the scanner cover to the main body,
    wherein the hinge apparatus comprises:
    a first body, with a void therein, movable in an opening in the main body;
    a pressure device movable within the void, and biased toward a first end of the first body;
    a second body, coupled to the scanner cover, rotatably connected to the first body, and movably engaging the pressure device; and
    a hinge shaft rotatably connecting the second body to the first body,
    wherein a center of the hinge shaft is located at a predetermined distance toward a direction of the document platen from a central line along which a center of the second body moves, and
    wherein the first body comprises a protrusion to limit an amount the first body moves out of the opening in the main body.

11. The image forming apparatus according to claim 10, wherein the main body is provided with a hooking portion for catching the protrusion of the first body.

12. The image forming apparatus according to claim 10, the second body is made of a lubricating resin.

13. The image forming apparatus according to claim 12, wherein the lubricating resin is selected from a group consisting of polyethylene, polybutylene terephthalate, and polyamide.

14. The image forming apparatus according to claim 10, wherein the pressure device comprises:
    a pusher; and
    a biasing element which biases the pusher toward the first end of the first body.

15. The image forming apparatus according to claim 14, wherein the pusher is made of a lubricating resin.

16. The image forming apparatus according to claim 15, wherein the lubricating resin is selected from a group consisting of polyethylene, polybutylene terephthalate, and polyamide.

17. The image forming apparatus according to claim 14, wherein an upper end of the biasing element is supported by a first support provided on the pusher.

18. The image forming apparatus according to claim 14, wherein a lower end of the biasing element is supported by a second support provided on the first body.

19. An image forming apparatus comprising:
    a main body having a document platen on which a document can be placed;
    a scanner cover to open and close an upper side of the document platen; and
    a hinge apparatus pivotably supporting the scanner cover to the main body,
    wherein the hinge apparatus comprises:
    a first body, with a void therein and a supporting bracket, movable in an opening in the main body;
    a pressure device movable within the void, and biased toward a first end of the first body;
    a second body, coupled to the scanner cover, rotatably connected to the supporting bracket, and movably engaging the pressure device; and
    a hinge shaft rotatably connecting the second body to the supporting bracket of the first body,
    wherein a center of the hinge shaft is located at a predetermined distance toward a direction of the document platen from a central line, along which a center of the pressure device and the second body move.

20. The image forming apparatus according to claim 19, the second body is made of a lubricating resin.

21. The image forming apparatus according to claim 20, wherein the lubricating resin is selected from a group consisting of polyethylene, polybutylene terephthalate, and polyamide.

22. The image forming apparatus according to claim 19, wherein the pressure device comprises:
    a pusher; and
    a biasing element which biases the pusher toward the first end of the hinge body.

23. The image forming apparatus according to claim 22, wherein the pusher is made of a lubricating resin.

24. The image forming apparatus according to claim 23, wherein the lubricating resin is selected from a group consisting of polyethylene, polybutylene terephthalate, and polyamide.

25. The image forming apparatus according to claim 22, wherein an upper end of the biasing element is supported by a first support provided on the pusher.

26. The image forming apparatus according to claim 22, wherein a lower end of the biasing element is supported by a second support provided on the hinge body.

27. The image forming apparatus according to claim 19, wherein the first body comprises a protrusion to limit an amount the first body moves out of the opening in the main body, and the main body is provided with a hooking portion for catching the protrusion of the first body.

28. An image forming apparatus comprising:
    a main body having a document platen on which a document can be placed;
    a scanner cover to open and close an upper side of the document platen; and
    a hinge apparatus pivotably supporting the scanner cover to the main body,
    wherein the hinge apparatus comprises:
    a first body, with a void therein and a supporting bracket, movable in an opening in the main body;
    a pressure device movable within the void, and biased toward a first end of the first body;
    a second body, coupled to the scanner cover, rotatably connected to the supporting bracket, and movably engaging the pressure device;

a hinge shaft rotatably connecting the second body to the supporting bracket of the first body, wherein a center of the hinge shaft is located at a predetermined distance toward a direction of the document platen from a central line, along which a center of the pressure device and the second body move, and wherein the second body has at least one protrusion connecting the second body to the supporting bracket of the first body.

29. The image forming apparatus according to claim 28, wherein the supporting bracket has two opposite holes, the second body has two protrusions inserted rotatably into the two opposite holes respectively.

30. The image forming apparatus according to claim 29, wherein the first body comprises a protrusion to limit an amount the first body moves out of the opening in the main body, and the main body is provided with a hooking portion for catching the protrusion of the first body.

31. The image forming apparatus according to claim 28, the second body is made of a lubricating resin.

32. The image forming apparatus according to claim 31, wherein the lubricating resin is selected from a group consisting of polyethylene, polybutylene terephthalate, and polyamide.

33. The image forming apparatus according to claim 28, wherein the pressure device comprises:
a pusher; and
a biasing element which biases the pusher toward the first end of the hinge body.

34. The image forming apparatus according to claim 33, wherein the pusher is made of a lubricating resin.

35. The image forming apparatus according to claim 34, wherein the lubricating resin is selected from a group consisting of polyethylene, polybutylene terephthalate, and polyamide.

36. The image forming apparatus according to claim 33, wherein an upper end of the biasing element is supported by a first support provided on the pusher.

37. The image forming apparatus according to claim 33, wherein a lower end of the biasing element is supported by a second support provided on the hinge body.

* * * * *